United States Patent
Hawkins et al.

(10) Patent No.: US 7,620,431 B2
(45) Date of Patent: *Nov. 17, 2009

(54) METHODS AND APPARATUS FOR CONTROLLING APPLICATIONS OF A MOBILE DEVICE BY USING A PIVOTING INPUT SWITCH

(75) Inventors: Jeffrey Charles Hawkins, Atherton, CA (US); Robert Yuji Haitani, Menlo Park, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/530,416

(22) Filed: Sep. 8, 2006

(65) Prior Publication Data
US 2007/0026851 A1    Feb. 1, 2007

Related U.S. Application Data

(63) Continuation of application No. 09/977,869, filed on Oct. 14, 2001, now Pat. No. 7,120,473.

(51) Int. Cl.
*H04M 1/00* (2006.01)

(52) U.S. Cl. .............. 455/575.1; 455/556.1; 455/556.2; 455/575.3; 455/575.4; 455/575.6; 345/156; 345/160; 345/173; 345/179; 345/184; 715/701; 715/702; 715/710; 715/716; 715/764

(58) Field of Classification Search ....... 455/90.1–90.3, 455/128, 550.1, 556.1, 556.2, 575.1, 575.9; 45/418; 345/156–157, 160–163, 173, 179–180, 345/184; 715/701–702, 707–708, 710, 716–722, 715/761–765
See application file for complete search history.

(56) References Cited

U.S. PATENT DOCUMENTS

| 4,885,704 | A |   | 12/1989 | Takagi et al. |
| 5,477,508 | A | * | 12/1995 | Will .......................... 368/189 |
| 5,504,500 | A |   | 4/1996  | Garthwaite et al. |
| 5,617,535 | A |   | 4/1997  | Aizawa et al. |
| 5,638,346 | A |   | 6/1997  | Aramaki |
| 5,673,404 | A | * | 9/1997  | Cousins et al. .............. 715/809 |
| 5,692,044 | A | * | 11/1997 | Hughes et al. .............. 379/422 |
| 5,717,534 | A |   | 2/1998  | Yahagi et al. |
| 5,825,353 | A | * | 10/1998 | Will .......................... 345/184 |
| 5,901,119 | A |   | 5/1999  | Inoue |
| 5,914,669 | A |   | 6/1999  | Wicks et al. |

(Continued)

OTHER PUBLICATIONS

"Blackberry — Wikipedia, the free encyclopedia," last modified May 17, 2008, [online] [Retrieved on May 22, 2008] Retrieved from the Internet<URL:http://en.wikipedia.org/wiki/BlackBerry>.

(Continued)

*Primary Examiner*—Fan Tsang
*Assistant Examiner*—Hemant Patel
(74) *Attorney, Agent, or Firm*—Fenwick & West LLP

(57) ABSTRACT

A mobile device includes at least one application and a user-controllable pivoting input switch. This application has a number of selectable items. This switch has a number of operational modes. Several of these operational modes direct the operation of the application to determine a current item according to an order.

19 Claims, 7 Drawing Sheets

U.S. PATENT DOCUMENTS

| | | | |
|---|---|---|---|
| 5,926,332 | A | 7/1999 | Yahagi et al. |
| 5,974,334 | A | 10/1999 | Jones, Jr. |
| 5,977,975 | A * | 11/1999 | Mugura et al. ............... 715/822 |
| 5,987,336 | A | 11/1999 | Sudo et al. |
| 5,999,827 | A | 12/1999 | Sudo et al. |
| 6,016,139 | A * | 1/2000 | Terasawa et al. ............ 345/169 |
| 6,064,725 | A * | 5/2000 | Nakanishi .................... 379/140 |
| 6,097,964 | A * | 8/2000 | Nuovo et al. ................. 455/566 |
| 6,128,625 | A | 10/2000 | Yankowski |
| 6,131,048 | A | 10/2000 | Sudo et al. |
| 6,138,039 | A * | 10/2000 | Sudo et al. ................... 455/566 |
| 6,141,540 | A | 10/2000 | Richards et al. |
| 6,178,338 | B1 * | 1/2001 | Yamagishi et al. ........... 455/566 |
| 6,195,569 | B1 * | 2/2001 | Frederiksen ................. 455/566 |
| 6,297,795 | B1 * | 10/2001 | Kato et al. ................... 345/684 |
| 6,297,838 | B1 * | 10/2001 | Chang et al. ................ 715/863 |
| 6,362,814 | B1 * | 3/2002 | Aizawa ....................... 345/169 |
| 6,392,640 | B1 * | 5/2002 | Will ............................ 345/184 |
| 6,396,482 | B1 | 5/2002 | Griffin et al. |
| 6,415,138 | B2 | 7/2002 | Sirola et al. |
| 6,430,314 | B1 | 8/2002 | Ko |
| 6,434,403 | B1 | 8/2002 | Ausems et al. |
| 6,452,588 | B2 * | 9/2002 | Griffin et al. ................. 345/169 |
| 6,483,500 | B1 * | 11/2002 | Choi et al. ................... 345/184 |
| 6,487,424 | B1 * | 11/2002 | Kraft et al. ................... 455/566 |
| 6,490,235 | B1 * | 12/2002 | Iida ............................ 369/47.1 |
| 6,498,601 | B1 * | 12/2002 | Gujar et al. .................. 345/173 |
| 6,502,090 | B1 | 12/2002 | Raisanen |
| 6,546,231 | B1 * | 4/2003 | Someya et al. ............ 455/550.1 |
| 6,591,151 | B1 | 7/2003 | Knopp et al. |
| 6,600,936 | B1 * | 7/2003 | Karkkainen et al .......... 455/566 |
| 6,622,174 | B1 * | 9/2003 | Ukita et al. .................. 709/246 |
| 6,633,930 | B2 * | 10/2003 | Sonehara et al. .............. 710/62 |
| 6,697,827 | B1 * | 2/2004 | D'Agosto, III .............. 708/131 |
| 6,771,250 | B1 | 8/2004 | Oh |
| 6,788,293 | B1 | 9/2004 | Silverbrook et al. |
| 6,795,097 | B1 * | 9/2004 | Yamaguchi et al. .......... 715/810 |
| 6,813,146 | B2 | 11/2004 | Haraguchi et al. |
| 6,903,728 | B1 * | 6/2005 | Baker et al. .................. 345/169 |
| 6,912,399 | B2 | 6/2005 | Zirul et al. |
| 7,016,704 | B2 * | 3/2006 | Pallakoff ..................... 455/566 |
| 7,120,473 | B1 * | 10/2006 | Hawkins et al. ........... 455/575.1 |
| 2002/0063678 | A1 | 5/2002 | Wong |
| 2003/0011564 | A1 * | 1/2003 | Ushino et al. ................ 345/156 |
| 2003/0045245 | A1 | 3/2003 | Hikishima |
| 2004/0066405 | A1 * | 4/2004 | Wessler et al. ............... 345/764 |
| 2008/0045280 | A1 | 2/2008 | Hawkins et al. |

OTHER PUBLICATIONS

Null, C., "The 50 Best Tech Products of All Time," Apr. 2, 2007, [online] Retrieved from the Internet<URL:www.pcworld.com/article/id,130207-page,4-c,technology/article.html>.

"RIM 850 Wireless Handheld™ Installation and User's Guide, version 2.0," Blackberry, 1999-2000 Research in Motion Limited, 204 pages.

\* cited by examiner

METHODS AND APPARATUS FOR CONTROLLING APPLICATIONS OF A MOBILE DEVICE BY USING A PIVOTING INPUT SWITCH

CROSS REFERENCE TO RELATED APPLICATIONS

This application is a continuation of U.S. patent application Ser. No. 09/977,869, entitled "Methods and Apparatus for Controlling a Mobile Device by Using a Pivoting Input Switch," by Jeff Hawkins and Rob Haitani, filed on Oct. 14, 2001, now U.S. Pat. No. 7,120,473 which is hereby incorporated by reference in its entirety.

FIELD OF ART

The invention relates to the field of computer-human interfaces. In particular, the invention relates to a pivoting input switch of a mobile device.

BACKGROUND

Handheld computing devices are becoming increasingly popular for both business users and more general users. For example, handheld computer systems such as the 3Com line of Palm handheld computers, the Handspring Visor line of handheld computer systems, and the Microsoft PocketPC have found widespread acceptance amongst people for the purpose of organizing their calendars and storing personal contact information.

Such handheld computer systems are very popular because they are small enough to be carried all the time and do not require any "boot" time before entering an operational state. Thus, such handheld computer systems allow constant easy access to a large amount of personal information.

Typically, these handheld computer systems contain computing applications such as (1) Personal Information Management (PIM) applications (e.g., an address book, a calendar, a memo pad, a To-Do list, etc.), (2) web browsing applications, (3) positioning (e.g., GPS) applications, (4) spreadsheet applications, etc.

Several mobile devices that perform computing and telephony operations have been offered to date. These mobile devices, however, do not provide a multi-function input switch that simplifies the navigation of the phone and computing applications.

Therefore, there is a need for such an input switch that can control and simplify the operation of phone and computing applications of a mobile device.

SUMMARY

Some embodiments of the invention provide a mobile device that performs at least one mobile computing application and at least one phone application. This mobile device includes a pivoting input switch. This switch has a number of operational modes. Several of these operational modes direct the operation of the mobile computing application. In addition, several operational modes direct the operation of the phone application.

In some embodiments, the switch pivots about a rotation axis to generate input signals during some of its operational modes. Examples of such a pivoting switch include a free-rotating dial and a rocking switch. In some embodiments, one mode of operating such a switch involves rotating the pivoting switch in the clockwise direction about the axis, while another mode of operating the switch involves rotating it in the counterclockwise direction. In some embodiments, the rotation of the switch directs the phone application to adjust the volume of a phone conversation.

In some embodiments, the pivoting switch can also be operated by pressing in the switch. Another mode of operating the switch in some embodiments is to press in the switch and hold it in this state for a duration of time. In some embodiments, the press-and-hold operation directs the phone application to perform a redial operation. Also, this operation directs the phone application to terminate an active call session in some embodiments.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

The invention provides method and apparatus for controlling a mobile device by using a pivoting input switch. In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 1B:
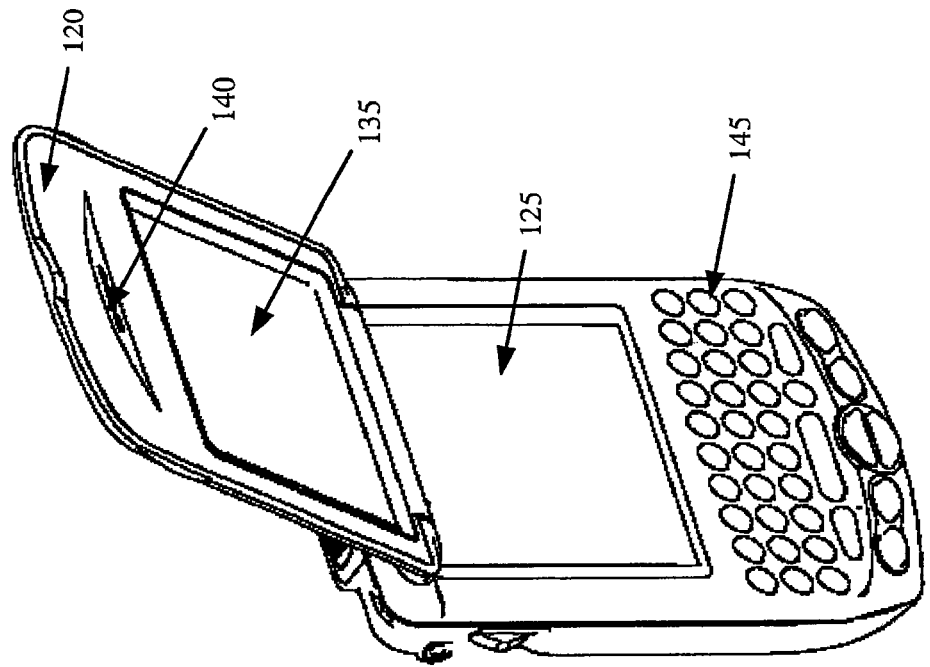
FIGS. 1A and 1B present perspective views of a mobile device of some embodiments of the invention.
Figure 1A:
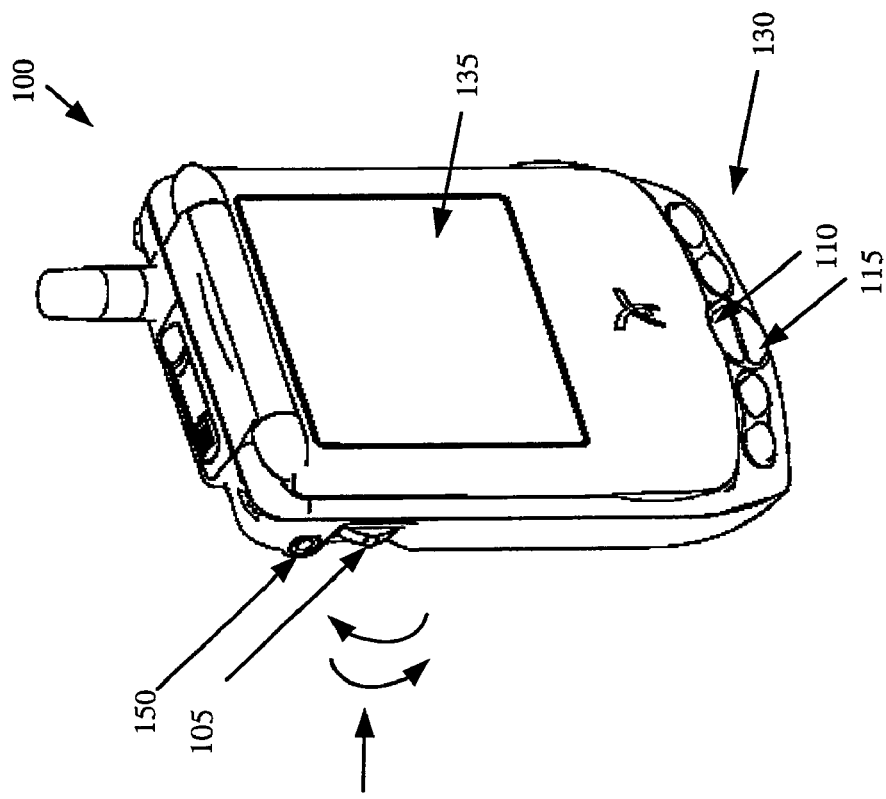

Several embodiments of the invention will be described below by reference to FIGS. 1-9. FIGS. 1A and 1B present perspective views of a mobile device 100 that performs both computing and telephony functions. This device is explained in detail in United States Patent Application entitled "Handheld Device", filed Oct. 13, 2001, and having the same assignee as this application. This application is incorporated herein by reference.

The handheld device 100 includes a touch-sensitive display screen 125 and a lid 120 that hingably connects to the front side of the device. FIG. 1A illustrates the lid in a closed state that covers the display screen, while FIG. 1B illustrates the lid in an open state that does not cover the display screen.

As shown in FIGS. 1A and 1B, the front side of the device also includes several buttons 130. These buttons include the scroll-up and scroll-down keys 110 and 115. Some applications associate the scroll-up key with the upward or rightward navigation of the application displayed on the display screen of the device, and associate the scroll-down key with the downward or leftward navigation of the application. Some applications might associate the pressing of keys 110 and 115 to signify other input commands. In a closed position, the lid extends over the display, leaving the buttons 130 physically accessible to touch for receiving input. In this manner, the device can receive input from the application buttons in the lid closed state.

The lid 120 includes a speaker 140 and a transparent portion 135. The transparent portion allows a user to see the display screen even when the lid is in the closed state. As further described below, this allows the user to use the device without opening the lid, which, in turn, makes the device more convenient and protects the display screen from unnecessary wear and tear. For example, a user can see the identity of who is calling on the display without opening the lid while at the same time providing a protective cover of the device's display. The lid itself can also be used to perform functions, as further discussed in United States Patent Application entitled "Handheld Device", filed Oct. 13, 2001, and having the same assignee as this application.

In the embodiments illustrated in FIG. 1B, the front side of the device also includes a keyboard 145, which is explained in the above-mentioned patent application. In these embodiments, the lid extends over the keyboard in the lid-closed state. One of ordinary skill will realize that in other embodiments the lid does not extend over the keyboard. Also, other embodiments include other types of keyboards, or include handwriting area for data entry, as explained in the above-mentioned patent application. In some of these embodiments, the lid also extends over the other keyboard types or over the handwriting area, while in other embodiments it does not.

As mentioned above, the handheld device 100 performs both computing and telephony functions. As a handheld computer, this device executes one or more common handheld computing applications, such as (1) Personal Information Management (PIM) applications (e.g., an address book, a calendar, a memo pad, a To-Do list, etc.), (2) web browsing applications, (3) positioning (e.g., GPS) applications, (4) spreadsheet applications, or other such applications.

Device 100 not only serves as a handheld computer, but it also serves as a phone. For its phone functionality, the device includes a radio transceiver (not shown) that enables the device to communicate wirelessly with other devices. In some embodiments, this radio transceiver and its associated circuitry can be turned ON/OFF independently of some or all of the other circuitry of the device.

In the embodiments described below, the device can engage in an active call when the radio in ON and either (1) the lid is in an open state (i.e., the lid has been rotated away from the display screen 125) such as the state illustrated in FIG. 1B, or (2) a single earpiece or full headset has been plugged into a headset plug-in socket 150 of the device 100. One of ordinary skill will realize that these two latter conditions might not necessarily be required in other embodiments. For instance, so long as the radio is ON, some embodiments might default to a speakerphone functionality when the lid is closed and no headset has been plugged into the socket 150.

This device typically uses a phone application to interface with the user. The phone application has a user interface that gives a user multiple different views of information that allow a user to make telephone calls in a simple intuitive manner. In some embodiments, the telephone user interface includes four permanently available views and a fifth view that is available when there is an active incoming or outgoing telephone call. The five different views include a speed dial view, a dial pad view, a contacts view, a call history view, and an active call view. This telephone interface is described in United States Patent Application entitled "Method and Apparatus for Accessing a Contacts Database and Telephone Services", filed Oct. 14, 2001, and having the same assignee as the current application. This application is incorporated herein by reference.

As shown in FIGS. 1A and 1B, the mobile device 100 includes a multi-function jog rocker 105. This rocker allows a user to interact in a variety of ways with the computing and phone applications of the device. Specifically, the jog rocker pivots about an axis in the clockwise and counterclockwise directions, as illustrated in FIGS. 1A and 1B. To pivot the rocker in the clockwise direction, the user pushes the rocker in that direction from a starting point to a first input-generating position. An input signal is generated when the rocker reaches the first input-generating position, and if the user keeps the rocker in this position, the input signal is repeatedly generated at a particular frequency. When the user releases the jog rocker, it returns to its starting position, as it is biased (e.g., through the use of a spring) to return to this position.

Similarly, to pivot the rocker in the counterclockwise direction, the user pushes the rocker in that direction from a starting point to a second input-generating position. An input signal is generated when the rocker reaches the second input-generating position, and if the user keeps the rocker in this position, the input signal is repeatedly generated at a particular frequency. When the user releases the jog rocker, it again returns to its starting position.

In FIGS. 1A and 1B, the jog rocker is positioned about the top-left side of the device 100. For such a position, some applications associate the clockwise pivoting of the jog rocker with the upward or rightward navigation of the application displayed on the display screen of the device, and associates the counterclockwise pivoting of the jog rocker with the downward or leftward navigation of the application. One example of such a movement is the scrolling through a list of telephone numbers, addresses, etc. The clockwise and counterclockwise pivoting of the jog rocker can also be used for adjusting the volume of phone conversations, as further described below. Some applications might associate such pivoting to signify other input commands.

As shown in FIGS. 1A and 1B, another mode of operating the jog rocker is to press it in towards its rotation axis (e.g., press in the rocker in a direction perpendicular to its rotation axis). In some applications, this pressing operation is associated with the selection of the item (e.g., a character or command) that is currently in focus (e.g., the item that is highlighted/bracketed, or that coincides with the position of a cursor). In some embodiments, pressing in the jog rocker while the device is OFF turns the device ON. In some of these embodiments, such a press not only turns ON the device but also causes the operating system to launch a particular application (e.g., the phone application). Some applications might associate such pressing to signify other input commands.

Yet another mode of operating the jog rocker 105 is to press the switch in, and to hold it in this state for a duration of time. In some embodiments, such a press-and-hold operation directs the phone application to perform a redial operation. Also, the press-and-hold operation directs the phone application to terminate an active call session in some embodiments. Some applications might associate the press-and-hold operation to signify other input commands.

As mentioned above, the lid's transparent portion 135 allows a user to see the entire display screen even when the lid is in the closed state. In such a state, a user can interact with the graphical user interface ("GUI") of applications that are displayed on the display screen, through the jog rocker 105 and the front-side buttons 130 (which are physically accessible when the lid is closed). This allows the user to use the device discretely and protects the display screen from unnecessary wear and tear. It also simplifies the use of the device, especially because of the ergonomically-positioned jog rocker.

Although device 100 includes a jog rocker 105, one of ordinary skill will realize that other embodiments might use a different type of pivoting switch. For instance, in some embodiments, the switch is a rotary dial that freely rotates in the clockwise and counterclockwise directions about the rotation axis. Each rotation of this dial by a predetermined angle generates an input signal.

Figure 2:
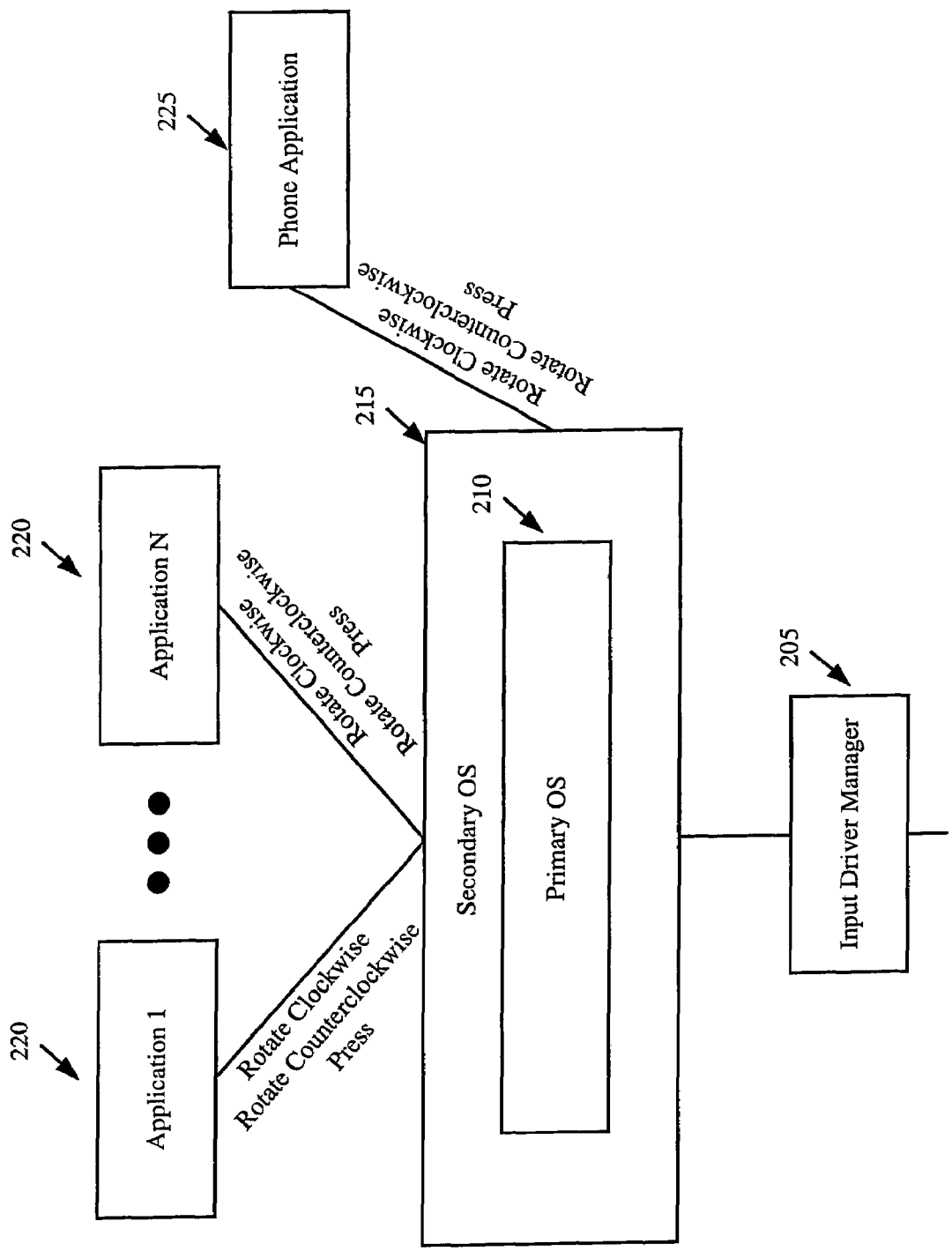
FIG. 2 illustrates the software architecture of the device of FIGS. 1A and 1B for some embodiments of the invention.

One of ordinary skill will realize that device 100 can use a variety of different operating systems. FIG. 2 illustrates a software architecture 200 for the device 100 that is based on the Palm Operating System (PalmOS). As shown in this figure, this architecture includes an input driver manager 205, two operating systems 210 and 215, several computing applications 220, and at least one phone application 225.

The input driver manager 205 detects signals from the input keys and switches of the device. It relays these signals as events to the operating systems 210 and 215. In some embodiments, the input manager 205 uses similar data to represent scroll-up events generated by the scroll-up key 110 and the pivoting key 105, and similar data to represent scroll-down events generated by the scroll-down key 115 and the pivoting key 105. In some of these embodiments, the input manager simply differentiates between events generated by the scrolling keys 110 and 115 and events generated by pivoting the switch 105 by setting a bit in the data packet to signify the source of the input signal as either a scrolling key 110/115 or the switch 105.

Such representation allows a user to use the pivoting operations of the switch to emulate the pressing of the scrolling keys 110 and 115 when the user is interfacing with applications that have been coded without knowledge of the pivoting switch 105. On the other hand, the applications that have been coded with the knowledge of the pivoting switch 105 can use the switch's pivoting operations to signify different input commands from the actuation of the scrolling keys 110 and 115. For instance, some applications might construe a clockwise rotation of jog rocker 105 to signify navigating upwards by one line-space unit, while construing the pressing of the scroll-up key 110 to signify a page-up command.

The operating system 210 is the PalmOS, while the operating system 215 is a secondary OS. In some embodiments, the order at the top of the event handling hierarchy is as follows: (1) the secondary OS, (2) the primary OS, and (3) the current active application. As the secondary OS is higher on the event handling hierarchy, it might override some of the operations of the primary OS.

As shown in FIG. 2, the computing applications 220 and the phone application 225 interface with the operating systems. Through this interface, these applications receive input events from the pivoting switch 105. As shown in FIG. 2, these events include (1) rotate clockwise events, (2) rotate counterclockwise events, and (3) press events.

In the embodiments described below, the applications 220 and 225 identify press-and-hold events based on the duration of time that they receive press events. However, one of ordinary skill will realize that in other embodiments the press-and-hold events might be generated by other software modules, such as the input driver manager 205.

Figure 3:
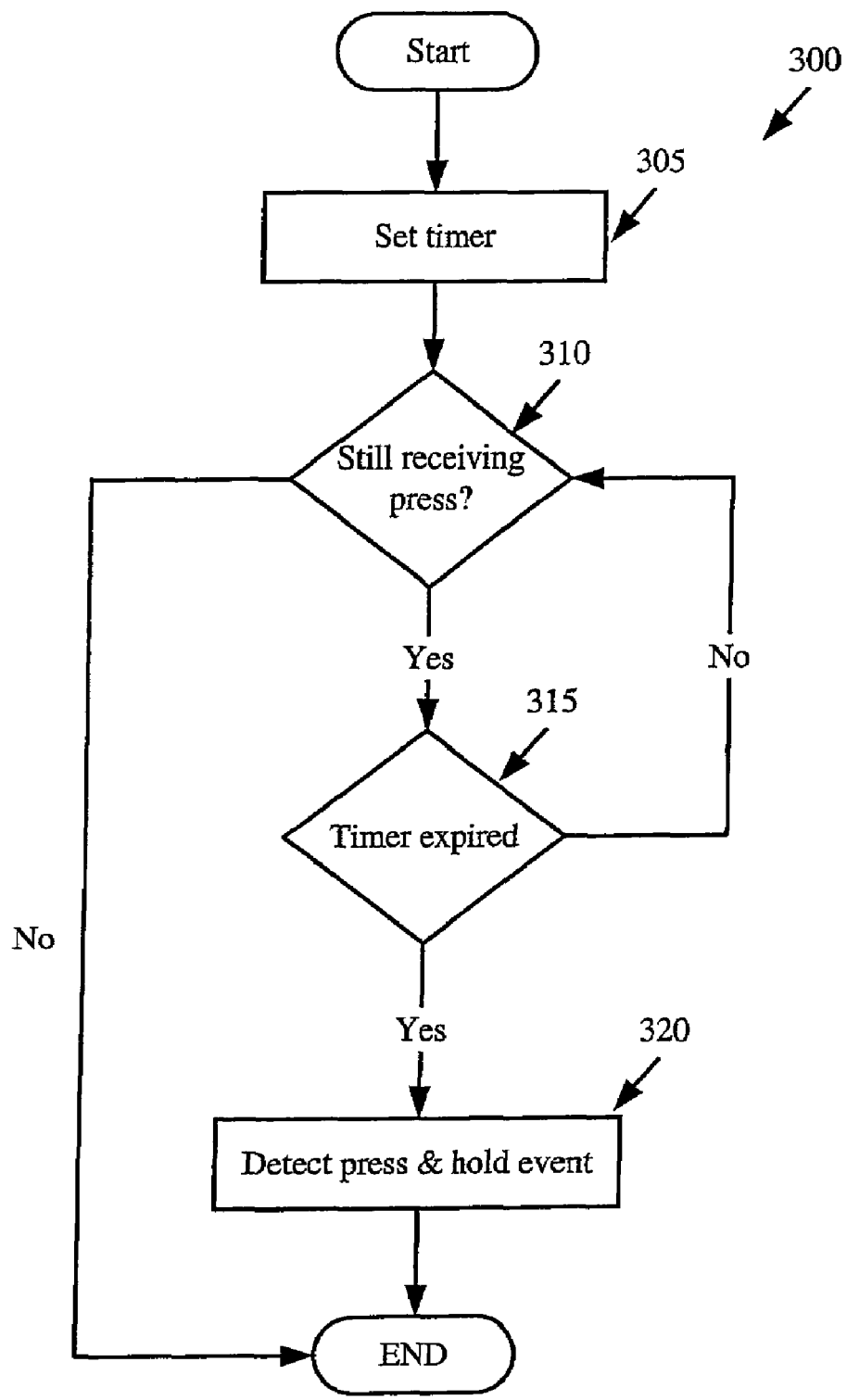
FIG. 3 illustrates a process for detecting a press and hold event in some embodiments.

FIG. 3 illustrates a process 300 for detecting a press and hold event in some embodiments. This process is performed by applications 220 and 225 in some embodiments of the invention. This process starts when an application receives a press event.

As shown in FIG. 3, this process initially sets (at 305) a timer. The process then determines (at 310) whether it is still receiving a press event. If not, the process ends without signaling a press-and-hold event. If the process determines (at 310) that it is still receiving a press event, it determines (at 315) whether the timer has expired. If so, it notes (at 320) that it has detected a press-and-hold event, and then ends.

On the other hand, if the process determines (at 315) that the timer has expired, it transitions back to 310 to determine whether the application is still receiving a press event. In some embodiments, this transition back to 310 is delayed by a time interval that is short compared to the time before the expiration of the timer (i.e., compared to the time required for holding the switch in the pressed position to detect a press-and-hold event).

Figure 4:
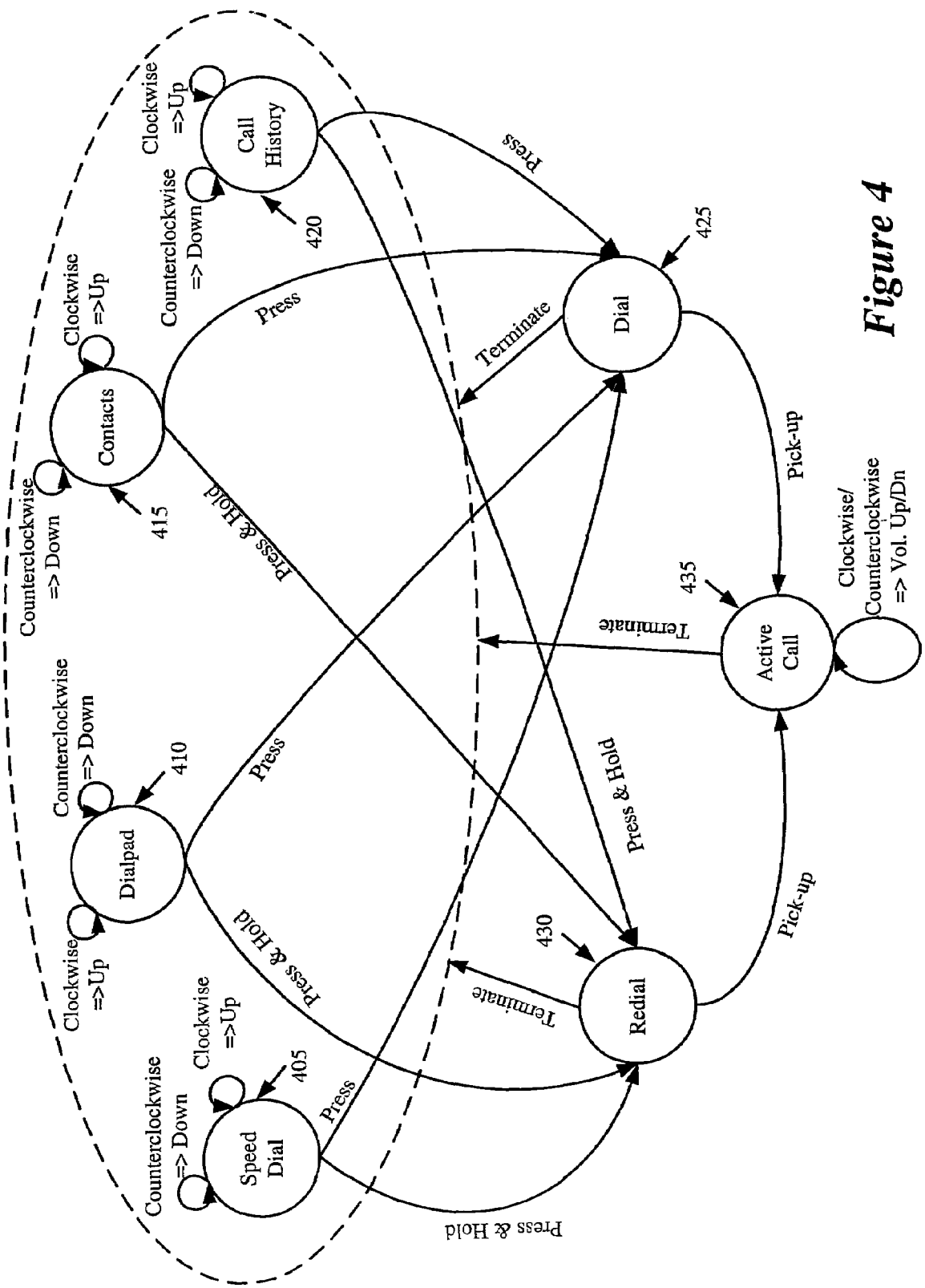
FIG. 4 illustrates how the rotation, press, and press-and-hold operations of a pivoting switch of the device of FIGS. 1A and 1B direct the interaction between a user and a phone application of the device.
Figure 5:
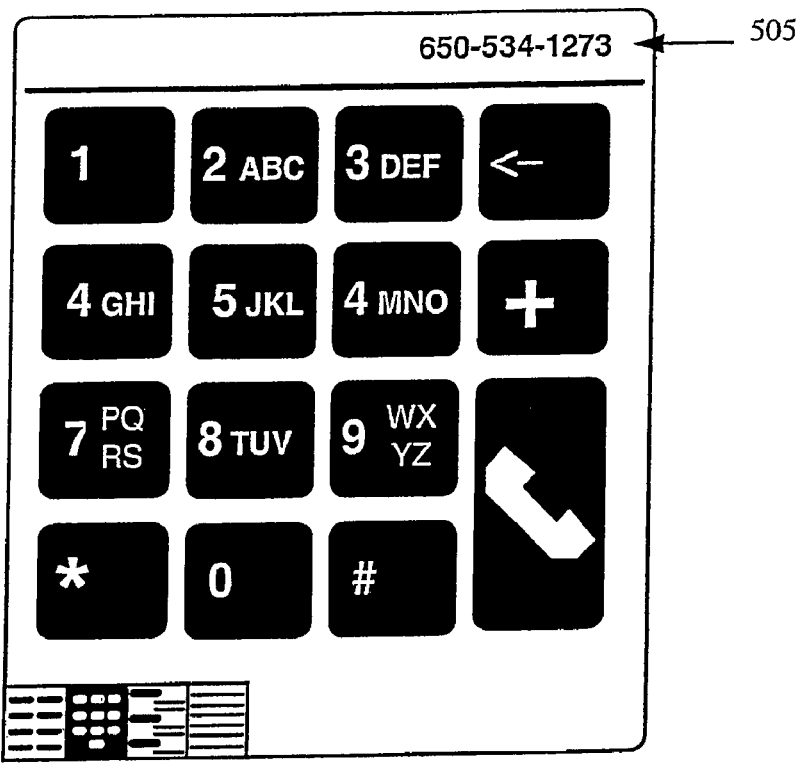
FIG. 5 illustrates a dial-pad view presented by the phone application.

As discussed above, rotating, pressing, and pressing-and-holding the pivoting switch 105 can initiate a number of different actions by different applications 220 and 225. FIG. 4 illustrates how the rotation, press, and press-and-hold operations of the pivoting switch 105 direct the interaction between a user and the phone application. One of ordinary skill will realize that this illustration provides only one exemplary design regarding how the pivoting switch can allow the user to interact with the phone application; numerous other designs are also possible.

In the example illustrated in FIG. 4, it is assumed that the device can engage in an active call as its radio in ON and either (1) the lid is in an open state such as the state illustrated in FIG. 1B, or (2) a headset has been plugged into the socket 150 of the device 100. When the lid is closed and no headset has been plugged into the socket, the embodiments describe below do not transition to the dial or redial states described below, until the user has either opened the lid or plugged in a headset. However, as mentioned above, other embodiments might allow a user to initiate a call even when the lid is closed and no headset has been plugged into the socket.

In the embodiments illustrated in FIG. 4, the phone application's user interface provides the above-mentioned five views, which include a speed-dial view, a dial-pad view, a contacts view, a call-history view, and an active-call view. FIGS. 5-9 present an example of each of these views. These views are further described in United States Patent Application entitled "Method and Apparatus for Accessing a Contacts Database and Telephone Services", filed on Oct. 14, 2001, and having the same assignee as the current application.

FIG. 4 illustrates a state diagram that describes how the rotation, press, and press-and-hold operations of the pivoting switch 105 direct the operation of the phone application. In this diagram, four states represent the permanent active views of the phone applications. These states are the speed-dial view 405, the dial-pad view 410, the contacts view 415, and the call-history view 420.

While the phone application is in any one of these four states, the clockwise and counterclockwise operations of the jog rocker 105 causes the phone application to navigate to the next selectable item that is above or below the current item in the view, as shown in FIG. 4. In the dial pad view, the selectable entries are telephone numbers that have been recently entered through the dial pad. Initially, to see the first telephone number in the title bar 505 of the dial pad view illustrated in FIG. 5, the user needs to rotate jog rocker in one particular direction (e.g., rotate the rocker clockwise); each subsequent rotation of the jog rocker brings to the title bar the next previous number on the dial-pad's list, and this number replaces the previous number displayed in the title bar.

Figure 6:
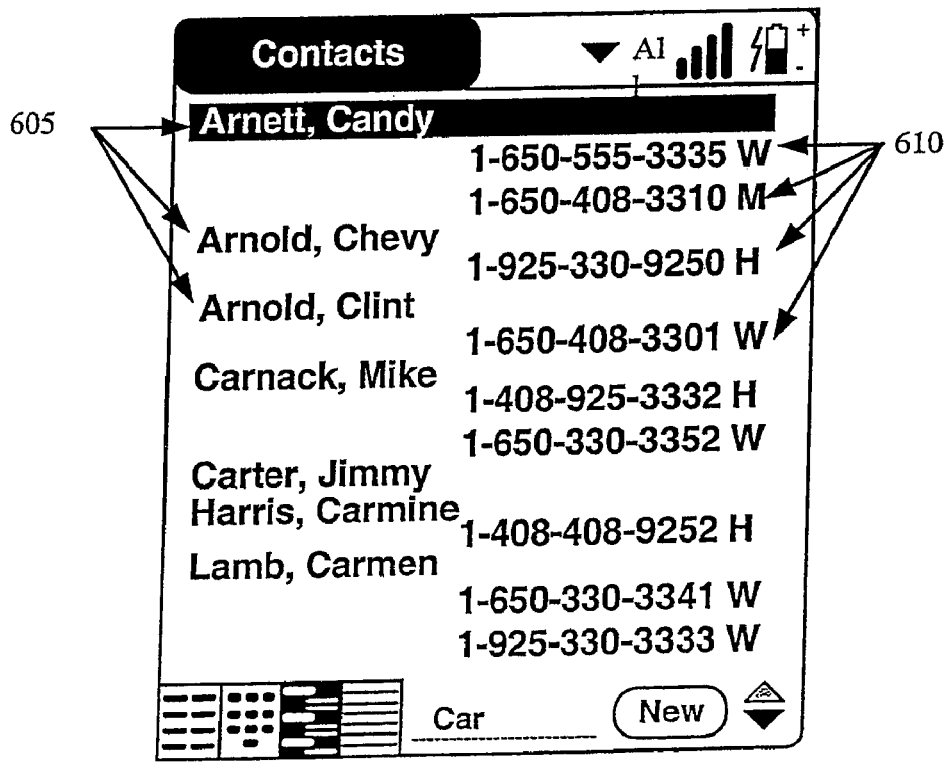
FIG. 6 illustrates a contacts view presented by the phone application.
Figure 7:
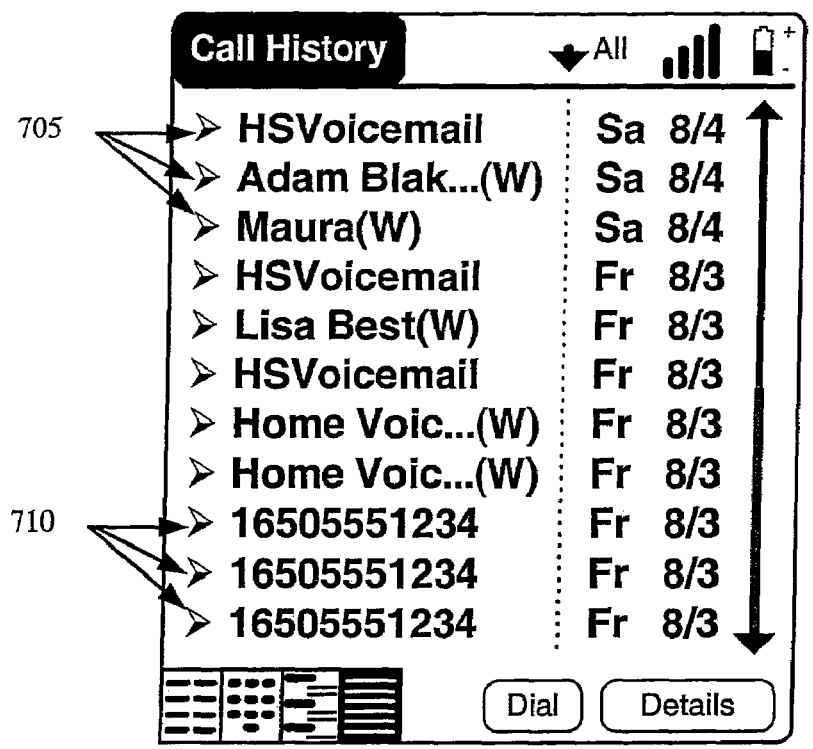
FIG. 7 illustrates a call-history view presented by the phone application.
Figure 8:
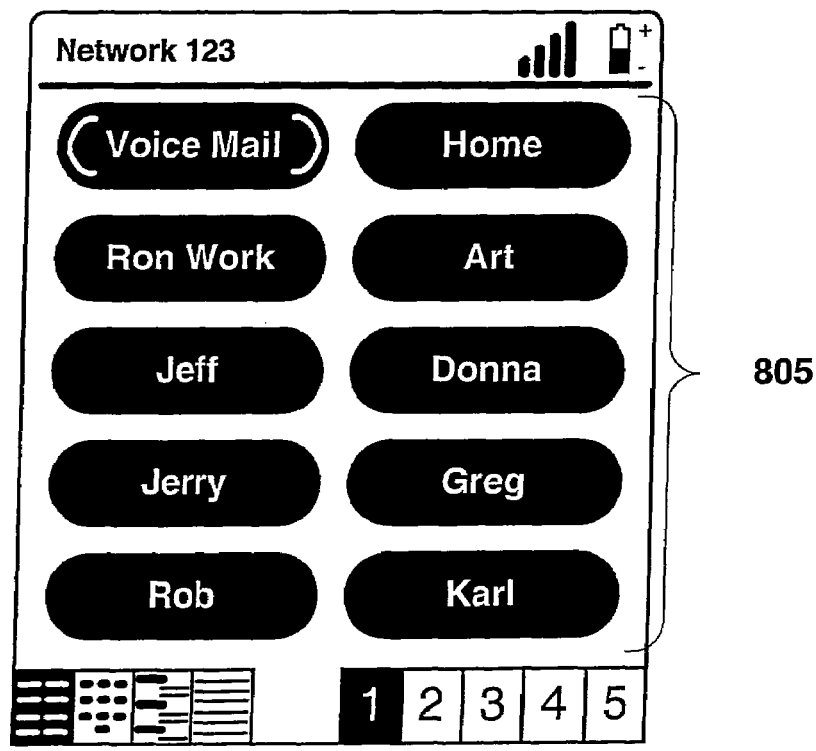
FIG. 8 illustrates a speed-dial view presented by the phone application.

In the contacts view, the selectable entries are names 605 and telephone numbers 610 as illustrated in FIG. 6. In the call-history view, the selectable entries are the names 705 or telephone numbers 710 of the most recent incoming, outgoing, and missed calls, as illustrated in FIG. 7. In the speed dial view, the selectable entries are the names 805 associated with commonly called telephone numbers, as illustrated in FIG. 8.

A selectable item that is in focus in any one of the views can be selected by pressing in the pivoting switch 105. In the speed-dial, dial-pad, and call-history views, the selection of any name or number causes the phone application to transition to a dial state 425, as shown in FIG. 4. As further shown in this figure, the selection of a telephone number in the contacts view also causes the phone application to transition to the dial state 425.

At the dial state 425, the phone application dials the selected telephone number or dials the number associated with the selected name. If the phone number that is dialed picks up, then the phone application transitions to the active call state 435, which will be described below. On the other hand, the call can terminate before the dialed number picks up. In some embodiments, a user can terminate the call by operating the pivoting switch. For instance, in some embodiments, the user can terminate an attempted call by pressing in the pivoting switch, while in other embodiments the user needs to press-and-hold the pivoting switch to terminate an attempted call.

When the call terminates before the dialed number picks up, the phone application transitions back to one of the four views 405-420. In some embodiments, the phone application transitions back to the state that it was in prior to the dial state. In other embodiments, the phone application transitions back to a default view state (e.g., the dial-pad state) of the phone application.

FIG. 4 also illustrates that the phone application transitions from each of the four permanent view states 405-420 to a redial state 430 when the user presses in the pivoting switch 105 and holds this switch in this position for a duration of time. In some embodiments, the phone application in the redial state 430 dials the telephone number of the most recent call or attempted call. If the phone number that is dialed picks up, then the phone application transitions to the active call state 435, which will be described below.

The redial attempt can terminate before the dialed number picks up. A user can terminate the call by pressing or pressing-and-holding the pivoting switch as described above. When the redial attempt terminates before the dialed number picks up, the phone application transitions back to one of the four views 405-420. As mentioned above, the phone application might transition back to the state that it was in prior to the dial state, or to a default view state (e.g., the dial-pad state).

Figure 9:
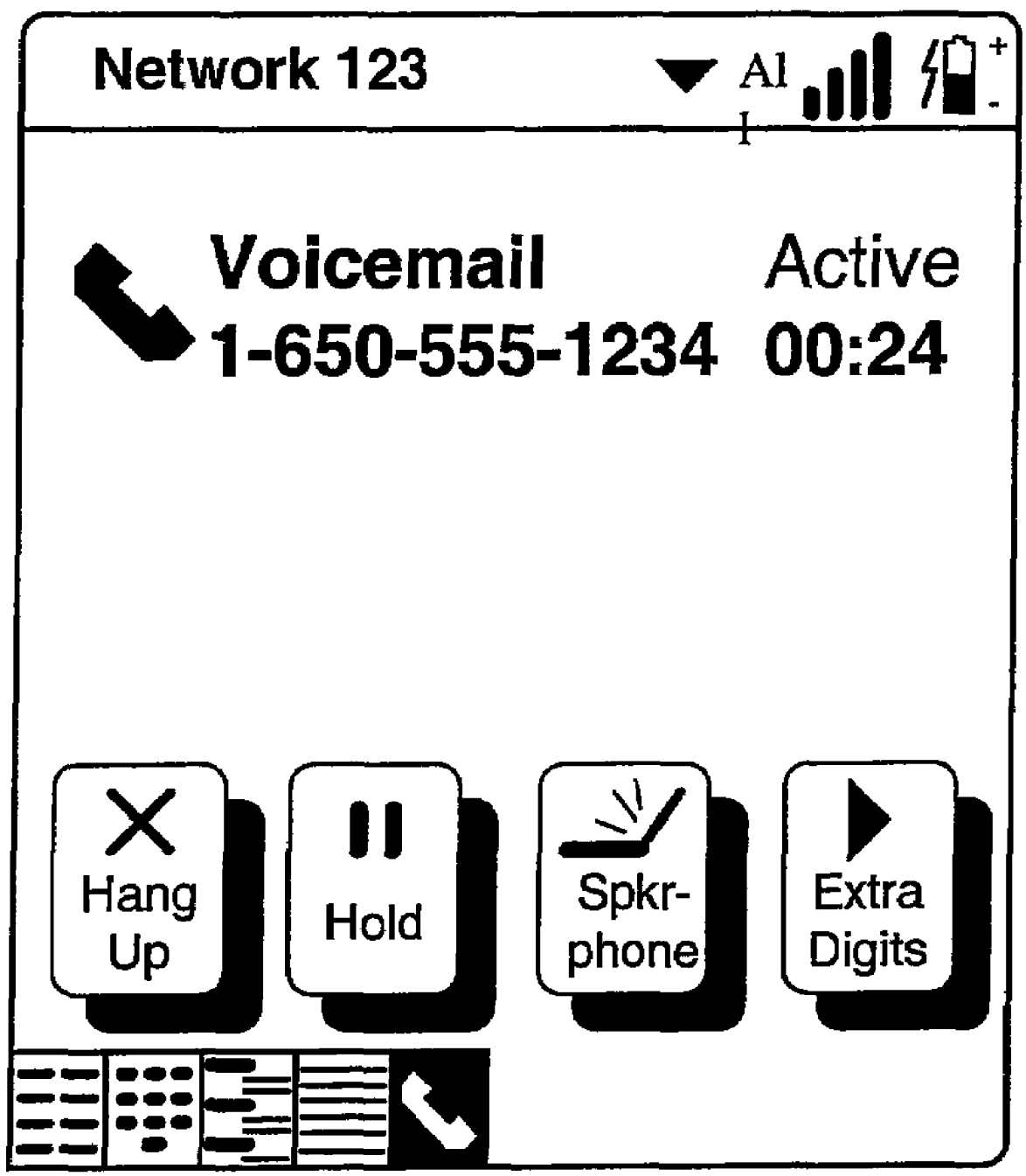
FIG. 9 illustrates an active-call view presented by the phone application.

As mentioned above, the phone application transitions to the active-call state 435 from either the dial state 425 or the redial state 430. The phone application also enters this state when the user receives an incoming call. While in the active-call state, the phone application provides the user with the active-call view, which is illustrated in FIG. 9.

In the active-call state, the phone application associates clockwise or counterclockwise rotation of the pivoting switch as attempts to increase or decrease the volume of the phone conversation, as illustrated in FIG. 4. When the phone application detects such attempts, it displays a volume-indication box that specifies the current volume of the headset, and adjusts the volume accordingly so long as it does not exceed the headsets maximum and minimum thresholds. Pressing in the pivoting switch dismisses the volume-indication box in some embodiments. Also, in some embodiments, a user can terminate an active call by pressing-and-holding the pivoting switch 105. Once an active call has been terminated, the phone application transitions back to one of the four views 405-420. For instance, in some embodiments, the phone application transitions back to the default view state (e.g., the dial-pad state) of the phone application.

For situations where the lid 120 is closed but a headset has been plugged into socket 150, the example presented in FIG. 4 illustrates a situation where a user through the pivoting switch 105 can operate the device while the lid is closed. Numerous other examples exist for using the device through the switch 105 and front-side input buttons 130 while the lid is closed.

The following provides one such example for some embodiments. While the lid is closed, the user can turn ON the device by pressing the pivoting input switch 105. The user can then initiate an Internet browsing application through one of the input buttons 130. The user can then use the switch 105 to interact with the browser to surf the web. To browse e-mails, the user could perform the same sequence of operations, except for using the input buttons to launch an e-mail application instead of a browser.

The jog rocker 105 provides an incredibly simple and yet powerful mechanism for allowing the user to interact with applications that are displayed on the display screen while the lid is open or closed. When the lid is closed, the jog rocker also allows the user to be discrete since the user can operate the rocker with one hand.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A mobile device comprising:
   at least one application, the application comprising a plurality of selectable items, the plurality of selectable items including a current item, the application configured in a first configuration or a second configuration;
   at least one scrolling key;
   a user-controllable pivoting input switch having multiple operational modes, wherein one operational mode comprises pivoting of the input switch in a first direction about an axis from a starting point to a first input-generating position, the input switch automatically returning to the starting point upon release after pivoting; and
   an input driver manager configured for detecting signals from the scrolling key and the input switch, and relaying the signals to the application;
   the application configured for executing a first operation that determines one of the plurality of selectable items to be the current item according to a predetermined order responsive to receiving a signal from the scrolling key corresponding to the scrolling key being pressed independent of whether the application configured in the first configuration or the second configuration;
   the application configured for executing the first operation responsive to receiving a signal from the input switch corresponding to the operational mode and the application configured in the first configuration; and
   the application configured for executing a second operation that is different from the first operation responsive to receiving the signal from the input switch and the application configured in the second configuration.

2. The mobile device of claim 1, wherein another operational mode comprises pivoting of the input switch in a second direction about the axis from the starting point to a second input-generating position, the input switch automatically returning to the starting point upon release after pivoting.

3. The mobile device of claim 2, wherein the second direction is opposite to the first direction.

4. The mobile device of claim 1, wherein another operational mode comprises depressing of the input switch in towards the axis.

5. The mobile device of claim 1, wherein another operational mode comprises depressing of the input switch in towards the axis and holding the depressing state for a duration of time.

6. The mobile device of claim 1, wherein the input switch comprises a dial structure or a rocking switch.

7. The mobile device of claim 1, wherein the application configured in the first configuration comprises the application configured without account for the input switch, and wherein the application configured in the second configuration comprises the application configured with account for the input switch.

8. The mobile device of claim 1, wherein the input switch is located on a side of the mobile device.

9. A method of operating a mobile device, the mobile device comprising a user-controllable pivoting input switch, at least one scrolling key, at least one application, the application comprising a plurality of selectable items, the plurality of selectable items including a current item, the application configured in a first configuration or a second configuration, the method comprising:
receiving signals from the scrolling key and the input switch by the application;
executing a first operation by the application that determines one of the plurality of selectable items to be the current item according to a predetermined order responsive to receiving a signal from the scrolling key corresponding to the scrolling key being pressed independent of whether the application configured in the first configuration or the second configuration;
executing the first operation by the application responsive to receiving a signal from the input switch corresponding to the input switch being pivoted in a first direction about an axis from a starting point to a first input-generating position and the application configured in the first configuration; and
executing a second operation that is different from the first operation by the application responsive to receiving the signal from the input switch and the application configured in the second configuration.

10. The method of claim 9 further comprising:
executing a third operation to the current item by the application responsive to receiving a signal from the input switch corresponding to the input switch being depressed in towards the axis and the application configured in the second configuration.

11. The method of claim 9 further comprising:
executing a third operation to the current item by the application responsive to receiving a signal from the input switch corresponding to the input switch being depressed in towards the axis and held the depressing state for a duration of time and the application configured in the second configuration.

12. The method of claim 9, wherein the application configured in the first configuration comprises the application configured without account for the input switch, and wherein the application configured in the second configuration comprises the application configured with account for the input switch.

13. The mobile device of claim 1, wherein the application is further configured for executing an operation on the current item responsive to determining the one of the plurality of selectable items to be the current item.

14. The mobile device of claim 1, wherein the first operation determines a selectable item adjacent to the current item to be the current item.

15. The method of claim 9, wherein executing the first operation further comprises:
executing a third operation on the current item.

16. The method of claim 9, wherein the input switch comprises a dial structure or a rocking switch.

17. A computer program product stored on a computer readable medium for operating a device, the computer program product controlling a processor coupled to the medium to execute the operations of:
receiving signals from a scrolling key of the device and a user-controllable pivoting input switch of the device by an application executed by the processor, the application configured in a first configuration or a second configuration;
executing a first operation by the application that determines one of a plurality of selectable items to be a current item according to a predetermined order responsive to receiving a signal from the scrolling key corresponding to the scrolling key being pressed independent of whether the application configured in the first configuration or the second configuration;
executing the first operation by the application responsive to receiving a signal from the input switch corresponding to the input switch being pivoted in a first direction about an axis from a starting point to a first input-generating position and the application configured in the first configuration; and
executing a second operation that is different from the first operation by the application responsive to receiving the signal from the input switch and the application configured in the second configuration.

18. The computer program product of claim 17, wherein the computer program product further controls the processor to execute the operations of:
executing a third operation to the current item by the application responsive to receiving a signal from the input switch corresponding to the input switch being depressed in towards the axis and the application configured in the second configuration.

19. The computer program product of claim 17, wherein the computer program product further controls the processor to execute the operations of:
executing a third operation to the current item by the application responsive to receiving a signal from the input switch corresponding to the input switch being depressed in towards the axis and held the depressing state for a duration of time and the application configured in the second configuration.

* * * * *